(12) United States Patent
Fukushima et al.

(10) Patent No.: US 8,263,190 B2
(45) Date of Patent: Sep. 11, 2012

(54) METHOD OF PRODUCING MAGNETIC RECORDING MEDIUM, AND MAGNETIC RECORDING AND READING DEVICE

(75) Inventors: Masato Fukushima, Chiba (JP); Akira Sakawaki, Ichihara (JP); Yasumasa Sasaki, Kamakura (JP)

(73) Assignee: Showa Denko K.K., Tokyo (JP)

( * ) Notice: Subject to any disclaimer, the term of this patent is extended or adjusted under 35 U.S.C. 154(b) by 116 days.

(21) Appl. No.: 12/600,416

(22) PCT Filed: Jun. 17, 2008

(86) PCT No.: PCT/JP2008/061384
§ 371 (c)(1),
(2), (4) Date: Nov. 16, 2009

(87) PCT Pub. No.: WO2008/156189
PCT Pub. Date: Dec. 24, 2008

(65) Prior Publication Data
US 2010/0165504 A1     Jul. 1, 2010

(30) Foreign Application Priority Data

Jun. 19, 2007  (JP) .................................. 2007-161581
Apr. 1, 2008   (JP) .................................. 2008-095018

(51) Int. Cl.
  *H05H 1/00*   (2006.01)
  *C23C 14/04*  (2006.01)
  *G11B 5/66*   (2006.01)

(52) U.S. Cl. ......... 427/539; 427/537; 427/526; 428/829

(58) Field of Classification Search .................. 427/535, 427/523, 524, 525, 526; 428/826, 836, 836.1, 428/836.2, 836.3
See application file for complete search history.

(56) References Cited

U.S. PATENT DOCUMENTS

| | | | | |
|---|---|---|---|---|
| 5,198,718 | A | * | 3/1993 | Davis et al. ................ 313/359.1 |
| 5,723,034 | A | | 3/1998 | Ohmi et al. |
| 6,168,845 | B1 | * | 1/2001 | Fontana et al. ............. 428/836 |
| 6,331,364 | B1 | * | 12/2001 | Baglin et al. ................ 428/830 |
| 6,841,224 | B2 | | 1/2005 | Kamata et al. |
| 7,067,207 | B2 | | 6/2006 | Kamata et al. |
| 7,147,790 | B2 | | 12/2006 | Wachenschwanz et al. |
| 7,161,753 | B2 | | 1/2007 | Wachenschwanz et al. |
| 7,572,528 | B2 | | 8/2009 | Yamamoto et al. |
| 2002/0142192 | A1 | * | 10/2002 | Kamata et al. ............. 428/694 T |
| 2005/0036223 | A1 | | 2/2005 | Wachenschwanz et al. |
| 2006/0222898 | A1 | | 10/2006 | Ichihara |
| 2010/0007985 | A1 | | 1/2010 | Fukushima et al. |

FOREIGN PATENT DOCUMENTS

| | | |
|---|---|---|
| JP | 61-120333 A | 6/1986 |
| JP | 05-205257 A | 8/1993 |
| JP | 6-53137 A | 2/1994 |
| JP | 6-131658 A | 5/1994 |
| JP | 11-120529 A | 4/1999 |
| JP | 2002-359138 A | 12/2002 |
| JP | 2004-164692 A | 6/2004 |
| JP | 2004-178793 A | 6/2004 |
| JP | 2004-178794 A | 6/2004 |
| JP | 2006-012216 A | 1/2006 |
| JP | 2006-209952 A | 8/2006 |
| JP | 2006-286159 A | 10/2006 |
| JP | 2006-309841 A | 11/2006 |
| JP | 2008-052860 A | 3/2008 |
| TW | 378318 B | 1/2000 |
| WO | 2008/026610 A1 | 3/2008 |
| WO | WO 2008026610 A1 * | 3/2008 |

OTHER PUBLICATIONS

Chappert et al. "Planar Patterned Magnetic Media Obtained by Ion Irradiation". Science vol. 280 No. 5371 pp. 1919-1922, Jun. 1998.*
Notice of Allowance issued in Japanese Patent Application No. 2008-095018 mailed Nov. 8, 2011.
Taiwanese Office Action issued in Taiwanese Patent Application No. 097122671 mailed Nov. 9, 2011.
Japanese Office Action issued in Japanese Patent Application No. 2008-180695 dated Mar. 21, 2012.

* cited by examiner

*Primary Examiner* — Dah-Wei Yuan
*Assistant Examiner* — Jose Hernandez-Diaz
(74) *Attorney, Agent, or Firm* — Sughrue Mion, PLLC

(57) ABSTRACT

The present invention aims to provide a method of producing magnetic recording medium which is a method of producing a magnetic recording medium having a magnetically-separated magnetic recording pattern, the method including: forming a magnetic layer on a non-magnetic substrate; then exposing a surface of the magnetic layer partially to reactive plasma, or a reactive ion generated in the plasma to amorphize the portion of the magnetic layer.

13 Claims, 3 Drawing Sheets

METHOD OF PRODUCING MAGNETIC RECORDING MEDIUM, AND MAGNETIC RECORDING AND READING DEVICE

TECHNICAL FIELD

The present invention relates to a method of producing a magnetic recording medium, and a magnetic recording and reading device where the magnetic recording medium or the magnetic recording and reading device are used in a hard disk device or the like.

BACKGROUND ART

In recent years, not only has the applicability of magnetic recording devices such as a magnetic disk device, flexible disk device, or magnetic tape device been remarkably broadened, and its importance has been increased, but the recording density of a magnetic recording medium used in such a device has also been remarkably improved. In particular, the area density has been strikingly increased since an MR head and the PRML technique were introduced. Recently, a GMR head, TMR head, etc. have been introduced, and the area recording density has been continuously increased at the rate of about 100% per year. Achievement of higher recording density is still sought in developing such a magnetic recording medium. Therefore, a higher coercive force, a higher signal-to-noise ratio (SNR), and higher resolution are required in the magnetic recording layer. Additionally, in recent years, considerable efforts have been devoted to increasing not only the track recording density but also the track density in order to increase area recording density.

The track density of the latest magnetic recording device reaches about 110 kTPI. However, as the track density is increased, magnetically-recorded data will interfere with each other between adjacent tracks. Consequently, the magnetic transition region of the boundary portion will be a noise source, and it is likely to impair the SNR. This leads to a increase of the bit error rate, and such a problem is an obstacle to improving the recording density.

In order to increase the area recording density, it is necessary to achieve the largest possible saturation magnetization and magnetic thickness in each recording bit on the magnetic recording medium by way of adjusting the size of each recording bit to be smaller. However, as the recording bit is made smaller, the magnetic minimum volume per bit will be small, and there is a problem in which recorded data disappear due to the flux reversal caused from heat fluctuation.

Furthermore, because the distance between tracks is narrower, such a magnetic recording device requires an extremely precise track servo technology, and also, a technique is generally adopted, in which recording is broadly done, and reading is done narrower than recording in order to exclude the influence from adjacent tracks as much as possible. In this method, the influence between tracks can be minimized. However, it is difficult to attain sufficient reading output in the method, and there is a problem in which it is difficult to obtain a sufficient SNR.

An example of a method which attempts to solve the problem of the heat fluctuation, to attain a sufficient SNR, or to attain a sufficient output can be mentioned. In this method, an attempt is made to increase the track density in the following way. That is, a projected part and a recessed part are formed on the surface of the magnetic recording medium along tracks to physically separate recording tracks from each other, thereby increasing the track density. Such a technique is called the "discrete track method", and the magnetic recording medium produced by the method is called as a "discrete track medium".

As an example of such a discrete track medium, a magnetic recording medium is known, where the magnetic recording medium is formed on a non-magnetic substrate having a projected and recessed pattern on its surface, and physically-separated magnetic recording tracks and a servo signal pattern are formed therein (For example, see Patent Document 1).

In this magnetic recording medium, a ferromagnetic layer is formed through a soft magnetic layer over the surface of the substrate having a plurality of projected and recessed parts thereon, and a protective layer is further formed on its surface. In the magnetic recording medium, a magnetic recording region is formed in the projected part, and the magnetic recording region is physically divided from the surroundings thereof. According to the magnetic recording medium, generation of a magnetic domain wall can be prevented in the soft magnetic layer. Consequently, the influence of heat fluctuation is negligible, and interference between adjacent signals does not occur. Therefore, it is considered that a high density magnetic recording medium which exhibits less noise can be produced.

The discrete track method includes the following two techniques. That is, a technique wherein tracks are formed after a magnetic recording medium including several thin layers is formed; or a technique wherein thin layers of the magnetic recording medium are formed directly on the surface of a substrate in advance or after a recessed and projected pattern is formed on the thin layers for the track-formation can be mentioned (for example, see Patent Document 2 or 3). The former technique is often called "magnetic layer-processing type". The technique has a disadvantage in which the medium is likely to be contaminated during the production process because physical processing is conducted on its surface after forming the medium, and the production process is very complicated. On the other hand, the latter method is often called an "embossing type", and contamination during its production process hardly occurs. However, the recessed and projected shape formed on the substrate will pass into layers formed thereon. Therefore, there is a problem in which the flying position and the flying height of a recording/reading head, which record or read data while flying over the medium, are not stable.

Furthermore, another method is disclosed (see Patent Documents 4 to 6). In the method, ions such as nitrogen or oxygen are injected into a magnetic layer formed in advance, or a laser beam is irradiated to the magnetic layer whereby magnetic properties of the treated portion are modified to form regions between the magnetic tracks of the discrete track medium.

However, the ion injection or the laser irradiation damages the magnetic layer in this method, and a projected and recessed structure is often formed on the surface of the magnetic layer. Additionally, the energy density is low with respect to the entire surface of the medium in this method although the injected ions or the laser has high energy, and there is a problem in which this requires a long-term treatment to modify the magnetic properties of the entire surface of the medium.

In addition, Patent Document 7 discloses a patterning method for a magnetic material wherein an exposed area of the surface of a ferromagnetic layer of a magnetic recording medium is exposed to an active reaction gas containing a halogen to fluorinate the ferromagnetic material whereby the ferromagnetic material is formed into a non-ferromagnetic body.

Patent Document 1: Japanese Unexamined Patent Application, Publication No. 2004-164692
Patent Document 2: Japanese Unexamined Patent Application, Publication No. 2004-178793
Patent Document 3: Japanese Unexamined Patent Application, Publication No. 2004-178794
Patent Document 4: Japanese Unexamined Patent Application, Publication No. H5-205257
Patent Document 5: Japanese Examined Patent Application, Publication No. 2006-209952
Patent Document 6: Japanese Unexamined Patent Application, Publication No. 2006-309841
Patent Document 7: Japanese Unexamined Patent Application, Publication No. 2002-359138

DISCLOSURE OF INVENTION

Because the method disclosed in Patent Document 7 does not include physical-processing of the magnetic layer, the method can prevent the magnetic layer from being contaminated during processing. Furthermore, the method can also accomplish modification of magnetic properties of the magnetic layer in a short time, compared to use of an ion beam or the like for modification of magnetic properties of the magnetic layer.

However, when the method of Patent Document 7 is used, a fluoride such as cobalt fluoride is formed around the magnetic recording region. Recently, it was found that such a fluoride gradually eroded the magnetic layer in the magnetic recording region. In particular, it was discovered that magnetic recording/reading properties were lowered over time when a hard disk drive using such a magnetic recording medium was utilized under conditions of high temperature and humidity.

The present invention is to produce a so-called "discrete track-type magnetic recording medium" or "patterned medium" having the following features at a high production rate using a simplified method. That is, even in magnetic recording devices that have recently faced technical difficulties as recording density increases, the produced discrete track-type magnetic recording medium or patterned medium can attain recording/reading properties equivalent or superior to conventional media, can remarkably increase the recording density, and can prevent write-errors during magnetic-recording by way of decreasing the coercive force and residual magnetization in regions between magnetic recording pattern areas. Furthermore, the discrete track-type magnetic recording medium or patterned medium has a higher area recording density, higher surface-flatness, and excellent environmental resistance.

In order to solve the above-described problem, the present inventors conducted intensive studies thereon, and this resulted in the present invention.

That is, the present invention relates to the following aspects.

(1) A method of producing a magnetic recording medium having a magnetically-separated magnetic recording pattern, the method including: forming a magnetic layer over a non-magnetic substrate; and then exposing a surface of the magnetic layer partially to reactive plasma, or a reactive ion generated in the plasma to amorphize the portion of the magnetic layer and to modify the magnetic properties of the portion whereby a magnetically-separated magnetic recording pattern is formed.

(2) The method of producing a magnetic recording medium according to (1), wherein the magnetization magnitude of the portion of the magnetic layer which is exposed to reactive plasma is adjusted to 75% or less of the original magnetization magnitude thereof in modifying the magnetic properties.

(3) The method of producing a magnetic recording medium according to (1) or (2), wherein the coercive force of the portion of the magnetic layer which is exposed to reactive plasma is adjusted to 50% or less of the original coercive force thereof in modifying the magnetic properties.

(4) The method of producing a magnetic recording medium according to any one of (1) to (3), wherein the reactive plasma is plasma which includes an oxygen ion generated by introducing a oxygen gas.

(5) The method of producing a magnetic recording medium according to any one of (1) to (4), wherein the reactive plasma includes a halogen ion.

(6) The method of producing a magnetic recording medium according to (5), wherein the portion of the magnetic layer which is exposed to the halogen ion does not substantially include a halide of a substance constituting the magnetic layer.

(7) The method of producing a magnetic recording medium according to (5) or (6), wherein the reactive plasma includes oxygen and a halogen.

(8) The method of producing a magnetic recording medium according to any one of (5) to (7), wherein the magnetic layer is exposed to plasma including oxygen, and then the magnetic layer is exposed to plasma including a halogen in exposing the surface of the magnetic layer partially to reactive plasma to modify magnetic properties of the portion of the magnetic layer.

(9) The method of producing a magnetic recording medium according to any one of (1) to (8), further including injecting an ion partially to the surface of the magnetic layer before exposing the surface of the magnetic layer partially to reactive plasma.

(10) The method of producing a magnetic recording medium according to (9), wherein the injected ion is argon or nitrogen.

(11) The method of producing a magnetic recording medium according to any one of (5) to (10), wherein the halogen ion is a halogen ion which is formed by introducing into the reactive plasma at least one halogenated gas selected from the group consisting of $CF_4$, $SF_6$, $CHF_3$, $CCl_4$, and KBr.

(12) The method of producing a magnetic recording medium according to any one of (5) to (11), wherein the halogen ion is an F ion.

(13) The method of producing a magnetic recording medium according to any one of (1) to (12), wherein, after the magnetic layer is formed over the non-magnetic substrate, a resist pattern for forming the magnetically-separated magnetic recording pattern is formed on the surface of the magnetic layer, and then, a portion which is not covered with the resist pattern is exposed to the reactive plasma to modify magnetic properties of the portion, thereby forming the magnetically-separated magnetic recording pattern.

(14) The method of producing a magnetic recording medium according to any one of (1) to (13), wherein a resist pattern is formed after a protective layer is formed on the magnetic layer.

(15) The method of producing a magnetic recording medium according to (14), wherein, before exposing the surface of the magnetic layer partially to reactive plasma or a reactive ion generated in the plasma, the resist pattern is formed on the surface of the protective layer after the protective layer is formed on the magnetic layer.

(16) The method of producing a magnetic recording medium according to any one of (1) to (15), wherein the magnetic recording pattern is a perpendicular magnetic recording pattern.

(17) A magnetic recording and reading device, including: the magnetic recording medium produced by the method of producing a magnetic recording medium according to any one of (1) to (16); an actuating device which actuates the magnetic recording medium in the recording direction; a magnetic head which includes a recording part and a reading part; a system which moves the magnetic head relatively to the magnetic recording medium; and a recording and reading signal-processing unit which inputs a signal to the magnetic head and which reads an output signal from the magnetic head.

According to the present invention, a magnetic recording medium which has excellent magnetic recording pattern-separating properties and excellent high recording-density properties, and which is unlikely influenced by the signal interference between adjacent patterns can be produced at a high production rate with regard to the magnetic recording medium wherein the magnetic recording pattern is formed after the magnetic layer is formed over the non-magnetic substrate.

Because the magnetic recording medium produced by the present invention has excellent surface-flatness, the magnetic recording medium can be applied to a magnetic recording and reading device that enables low-flying height of a magnetic head.

Furthermore, because the magnetic recording medium of the present invention has excellent environmental resistance, the magnetic recording medium can be stably used under conditions of high temperature and humidity (for example, applicable to a car navigation system).

BRIEF DESCRIPTION OF THE DRAWINGS

In FIG. 4, (a) refers to before treating the recording medium with reactive plasma while (b) refers to after treating the magnetic recording medium with reactive plasma.

In FIG. 5, (a) refers to a signal before treating the magnetic layer with reactive plasma while (b) and (c) refer to a signal after treating the magnetic layer with reactive plasma. In (b), a bias voltage is applied to the substrate during the treatment, and oxygen is added to the plasma.

Figure 1:
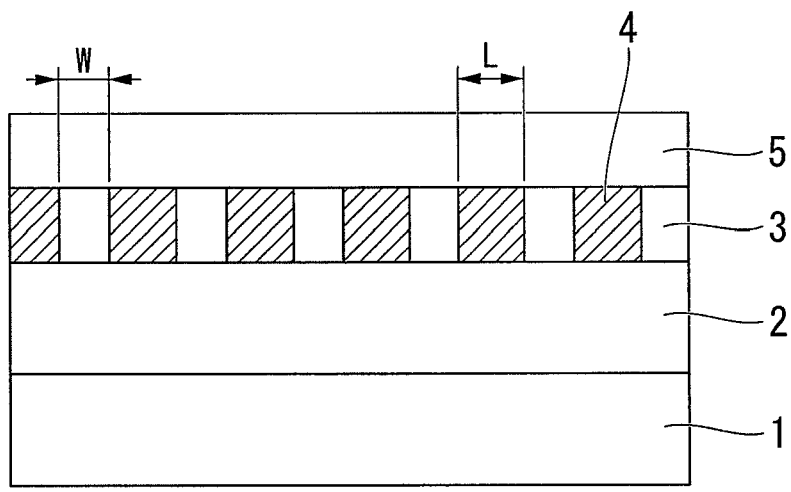
FIG. 1 shows a cross-sectional structure of the magnetic recording medium according to the present invention.

The numerical symbol "1" refers to a non-magnetic substrate; the numerical symbol "2" refers to an soft magnetic layer and an intermediate layer; the numerical symbol "$2a$" refers to an soft magnetic layer; the numerical symbol "$2b$" refers to an intermediate layer; the numerical symbol "3" refers to a magnetic layer; the numerical symbol "4" refers to a non-magnetized layer; the numerical symbol "5" refers to a protective layer; the reference numeral "6" refers to a resist pattern; the numerical symbol "11" refers to a medium-actu- ating unit; the numerical symbol "27" refers to a magnetic head; the numerical symbol "28" refers to a head-actuating unit; the numerical symbol "29" refers to a signal recording and reading unit; and the numerical symbol "30" refers to a magnetic recording medium.

BEST MODE FOR CARRYING OUT THE INVENTION

The present invention relates to a magnetic recording medium having a magnetically-separated magnetic recording pattern over one side of a non-magnetic substrate. The formed magnetic layer is exposed to an ionized content in reactive plasma or plasma to amorphize the portion of the magnetic layer, thereby producing a region which separates the magnetic recording pattern part. The method of producing a magnetic recording medium according to the present invention, during magnetically separating the magnetic recording pattern part, does not cause dust generation, which frequently occurs in the step of physically excising the magnetic layer (for example, by way of ion-milling) as included in conventional production methods. Furthermore, the production method of the present invention does not include a step such as injecting ions into the magnetic layer (i.e. a step which damages the magnetic layer).

In the present invention, the magnetic layer that forms the magnetic recording pattern is exposed to an ionized content in reactive plasma or plasma to amorphize a portion of the magnetic layer. When the magnetic layer is exposed to reactive ions or the like, an ionized product of a magnetic alloy is produced on the exposed portion. For example, as disclosed in Patent Document 7, when a Co-based magnetic alloy is exposed to fluorine ion plasma, the Co-based magnetic alloy is converted to cobalt fluoride which is non-magnetic. This is because ions included in reactive plasma have high reactivity, and the ions are easily reacted with the magnetic alloy, etc. In the method of producing a magnetic recording medium of the present invention, with respect to the magnetic layer exposed to such a reactive ion, etc. the magnetic alloy is not non-magnetized with a reaction product of the magnetic alloy and an ion, but is non-magnetized by way of amorphizing. This is because such ions used for non-magnetizing the magnetic layer gradually diffuse into the surrounding magnetic alloy that forms the magnetic recording pattern, thereby impairing magnetic properties of the portion over time, and therefore such impairment thereof needs to be prevented.

Figure 5:
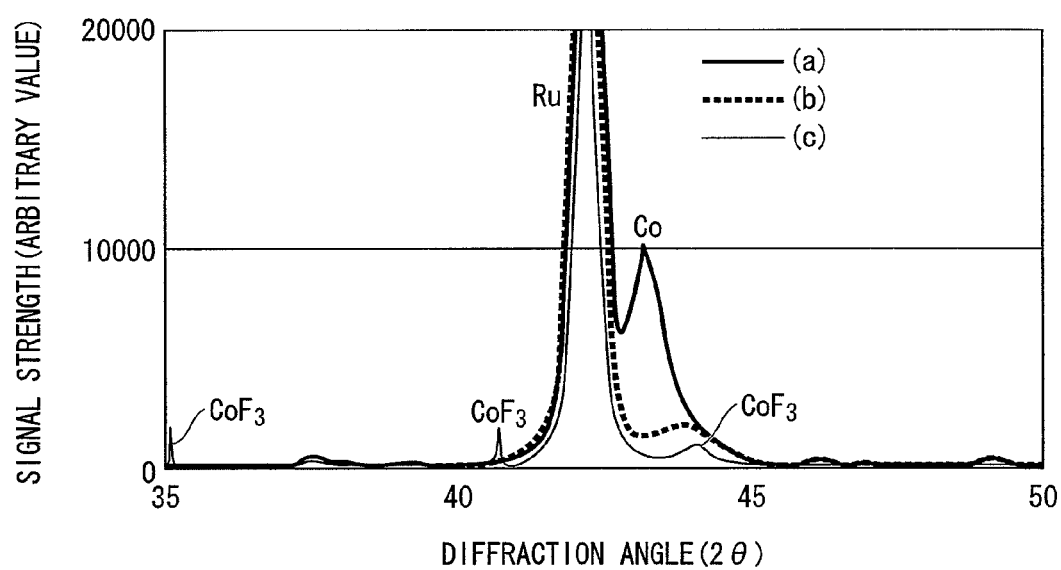
FIG. 5 is a diagram showing results of X-ray diffraction analysis before and after treating the magnetic layer with reactive plasma.

With regard to the method of amorphizing the magnetic alloy of the portion by reacting the magnetic alloy with reactive plasma, a method wherein ions in reactive plasma are collided against the magnetic alloy to physically destroy the structure of the portion can be mentioned. Moreover, a method wherein the magnetic alloy is reacted with ions in reactive plasma to produce an ionized product of the magnetic alloy, and then, only the ionized compound of the magnetic alloy is removed can be also considered. For example, a technique wherein a Co-based magnetic alloy is exposed to a reactive fluorine ion to form non-magnetic cobalt fluoride, and the cobalt fluoride is heated to only remove the fluorine thereof, and an amorphous Co-based alloy whose crystal structure is destroyed is produced can be mentioned. The condition for producing such an amorphous magnetic alloy can be determined by appropriately selecting a composition of the magnetic alloy, a type of ion included in reactive plasma, reaction pressure, reaction time, temperature, etc. For example, FIG. 5 shows the results of X-ray diffraction analysis with respect to a reaction product of a magnetic alloy of $70Co-5Cr-15Pt-10SiO_2$ with reactive plasma generated by using $CF_4$. FIG. 5 (a) shows the results of X-ray diffraction with respect to the magnetic layer before reacting it with the reactive plasma. In the figure, the large signal present around a diffraction angle of 42° refers to a diffraction peak of an Ru intermediate layer present under the magnetic layer, and the signal present around 43° refers to a diffraction peak of Co included in the magnetic alloy. FIG. 5 (b) shows the results of X-ray diffraction where the magnetic layer is exposed to reactive plasma including a fluorine ion for 60 seconds. With regard to conditions, $CF_4$ and $O_2$ were used at 10 cc/minute and 90 cc/minute, respectively; the voltage applied for plasma generation was 200 W; the pressure inside the apparatus was 0.5 Pa; and the substrate bias was 200 W. In addition, the temperature of the substrate was about 150° C. during the treatment. Due to this reaction, the peak around 43° disappeared, but a peak derived from cobalt fluoride was not present. Moreover, the peak around 42° of the Ru intermediate layer remained. The result revealed that the Co-based magnetic alloy lost its own crystal properties and was amorphized. Furthermore, FIG. 5 (c) refers to a case where the magnetic layer of FIG. 5 (a) was exposed to reactive plasma including a fluorine ion. However, contrary to conditions of FIG. 5 (b), the substrate bias was not applied, and oxygen was not added to the treatment gas, only using $CF_4$. In this case, the peak around 43° disappeared, and peaks derived from cobalt fluoride were present around 35°, 41° and 44° while the peak of the Ru intermediate layer remained.

Based on studies conducted by the present inventors, a method of controlling halogenization or amorphization of the magnetic alloy in modifying the magnetic layer using reactive plasma including a halogen ion includes the following.

1) A bias voltage can be applied to the substrate to promote the amorphization. It is considered that this is because the destruction of the crystal structure can be easily promoted in the magnetic layer due to the ion bombardment, compared to a halogenization reaction with a halogen ion.
2) If the halogen in reactive plasma is in a state of radicals, halogenization of magnetic particles is easily promoted. On the other hand, if the halogen is in a state of ions, amorphization of magnetic particles is easily promoted. It is considered that this is because there is a difference in the reactivity of halogen.
3) When $CF_4$ is used as the gas including a halogen, halogenization of magnetic particles is easily promoted. On the other hand, when $SF_6$ is used, amorphization thereof is easily promoted. It is considered that this is due to properties of a halogenized gas.
4) When oxygen is added to reactive plasma, amorphization of magnetic particles is easily promoted. It is considered that this is because oxidation of magnetic particles is more easily promoted than halogenization thereof.
5) When the magnetic layer has a granular structure where an oxide is included in the grain boundary, halogenization of magnetic particles is difficult to be promoted. This is because the reaction of the oxide with the halogen ion is first started.

The magnetic recording pattern part of the present invention includes a so-called "patterned media" wherein a magnetic recording pattern is arranged having predetermined regularity at every 1 bit; a media wherein a magnetic recording pattern is arranged trackwise; or another media such as a servo-signal pattern.

In particular, it is preferable that the present invention be applied to a so-called "discrete-type magnetic recording medium" whose magnetically-separated magnetic recording pattern is a magnetic recording track and a servo-signal pattern because of ease of its production.

The present invention will be further described in detail with reference to such a discrete-type magnetic recording medium.

A cross-sectional structure of a discrete-type magnetic recording medium according to the present invention is shown in FIG. 1. The magnetic recording medium 30 of the present invention has a structure wherein a soft magnetic layer and an intermediate layer 2 are formed on the surface of a non-magnetic substrate 1; a magnetic layer 3 and a non-magnetized layer 4 where a magnetic pattern is formed are formed thereon; a protective layer 5 is further formed thereon; and a lubricating film is formed on the outermost surface (not shown in the figure).

In order to enhance the recording density, it is preferable that a magnetic portion width "W" of the magnetic layer 3 having a magnetic pattern be 200 nm or less, and it is preferable that a non-magnetic portion width "L" be 100 nm or less. Accordingly, it is preferable that a track pitch "P" (P=W+L) be narrowed as much as possible within a range of 300 nm or less.

The non-magnetic substrate 1 used in the present invention can be suitably selected from various non-magnetic substrates. For example, an Al-alloy substrate including Al as a main component (for example, Al—Mg alloy); or a substrate which is made of general soda glass, aluminosilicate-based glass, crystallized glass, silicon, titanium, ceramics, or resins can be mentioned. In particular, use of an Al-alloy substrate, a glass substrate such as crystallized glass, or a silicon substrate is preferable. In addition, the average surface roughness of the substrate (Ra) is preferably 1 nm or less, more preferably 0.5 nm or less, and most preferably 0.1 nm or less.

The magnetic layer 3 formed over the surface of the non-magnetic substrate 1 as described above may be formed into a longitudinal magnetic recording pattern (as longitudinal magnetic recording media) or a perpendicular magnetic recording pattern (as perpendicular magnetic recording media). However, a perpendicular magnetic recording pattern is preferable in order to achieve higher recording density. That is, it is preferable that the magnetic recording pattern of the present invention be a perpendicular magnetic recording pattern although the magnetic recording pattern can be longitudinal magnetic recording pattern. It is preferable that the magnetic layer be formed from an alloy which includes Co as a main component in either longitudinal or perpendicular magnetic recording media.

For example, with regard to a magnetic layer used for longitudinal magnetic recording media, a laminate structure which includes a non-magnetic CrMo underlying layer and a ferromagnetic CoCrPtTa magnetic layer can be utilized.

With regard to a magnetic layer used for perpendicular magnetic recording media, a laminate structure where a soft magnetic layer which is formed of, for example, a soft magnetic FeCo alloy (such as FeCoB, FeCoSiB, FeCoZr, FeCoZrB, or FeCoZrBCu), a FeTa alloy (such as FeTaN or FeTaC), or a Co alloy (such as CoTaZr, CoZrNB, or CoB); an orientation-controlling film such as Pt, Pd, NiCr, or NiFeCr; an intermediate layer such as Ru (if necessary); and a magnetic layer which is formed of a 60Co-15Cr-15Pt alloy or a 70Co-5Cr-15Pt-10$SiO_2$ alloy are laminated can be utilized.

The thickness of the magnetic layer may be within a range of 3 nm to 20 nm, and preferably within a range of 5 nm to 15 nm. The magnetic layer may be appropriately formed depending on a type of magnetic alloy and laminate structure used therein, such that a sufficient head output can be obtained. The magnetic layer needs to have a certain thickness or higher in order to obtain a certain level of the output during reading. To the contrary, as the output increases, several parameters that represent recording/reading properties are generally deteriorated. Therefore, it is necessary to select the optimum thickness thereof.

In general, the magnetic layer is formed into a thin film by the sputtering method.

Hereinafter, the method of producing a magnetic recording medium of the present invention will be described in detail.

In the present invention, the formed magnetic layer is exposed to reactive plasma to amorphize a portion of the magnetic layer 3. Consequently, magnetic properties of the portion are modified whereby a region which magnetically separates the magnetic recording track and servo-signal pattern part is formed.

"Modifying magnetic properties of the magnetic layer" specifically means modifying coercive force, residual magnetization, among others, of the magnetic layer. More specifically, such modification refers to lowering the coercive force and the residual magnetization.

Particularly, in the present invention, the following method is preferably adopted to modify the magnetic properties. In the method, the magnetization magnitude is adjusted to 75% or less, or more preferably 50% or less of the original magnetization magnitude, and the coercive force is adjusted to 50% or less, or more preferably 20% or less of the original coercive force with respect to the portion of the magnetic layer 3 exposed to reactive plasma. If a discrete track-type magnetic recording medium is produced by such a method, write-errors can be prevented during magnetically-recording data into the medium, and a magnetic recording medium having a higher area recording density can be provided.

In the present invention, the formed magnetic layer 3 is exposed to reactive plasma to amorphize the magnetic layer whereby the region which magnetically separates the magnetic recording track and servo-signal pattern part is formed.

In the present invention, "to amorphize the magnetic layer" refers to forming an atomic arrangement of the magnetic layer 3 into a state of an irregular atomic arrangement which does not have a long-distance order. More specifically, this refers to a state where fine crystal particles of 2 nm or less are randomly arranged. When such a state of the atomic arrangement is confirmed by an analysis method such as the X-ray diffraction or electron diffraction, a peak that represents the crystal plane is not present while only a halo (a broad signal) is present.

As an example of the reactive plasma in the present invention, the inductively coupled plasma (ICP) or the reactive ion plasma (RIE) can be mentioned.

The inductively coupled plasma is high-temperature plasma that is obtained in the following way. That is, a high voltage is applied to a gas to form plasma, and Joule heat is generated inside the plasma due to eddy current by forming a high-frequency fluctuating magnetic field to form the high-temperature plasma. The inductively coupled plasma has a higher electron density. Therefore, the plasma can achieve modification of magnetic properties in a magnetic layer 3 having a broad area at higher efficiency, compared to the conventional production of discrete track media using an ion beam.

The reactive ion plasma is highly-reactive plasma where a reactive gas such as $O_2$, $SF_6$, $CHF_3$, $CF_4$, or $CCl_4$ is added to the plasma. By using such plasma as the reactive plasma in the present invention, modification of magnetic properties of the magnetic layer 3 can be achieved at higher efficiency.

In the present invention, the formed magnetic layer 3 is exposed to reactive plasma in order to modify the magnetic layer 3. It is preferable that the modification be achieved by a reaction of a magnetic metal included in the magnetic layer 3 with atoms or ions in reactive plasma. The reaction includes modification of the crystal structure of the magnetic metal, modification of the composition of the magnetic metal, oxidation of the magnetic metal, nitridation of the magnetic metal, silication of the magnetic metal, among others, due to penetration of atoms, etc. in the plasma into the magnetic metal.

In the present invention, in particular, it is preferable that oxygen atoms be included in the reactive plasma, and that the magnetic metal included in the magnetic layer 3 be reacted with the oxygen atoms in the reactive plasma to oxidize the magnetic layer 3. The magnetic layer 3 is partially oxidized, and the residual magnetization, the coercive force, among others, of the oxidized portion can be efficiently decreased. Therefore, a magnetic recording medium including a magnetically-separated magnetic recording pattern can be produced by the short-term reactive plasma treatment. In addition, the inclusion of oxygen atoms in the reactive plasma can promote amorphization of the magnetic layer 3.

In the present invention, it is preferable that a halogen atom be included in the reactive plasma. Moreover, use of an F atom is preferable as the halogen atom. The halogen atom may be added to the reactive plasma with or without oxygen atoms. As described above, when oxygen atoms or the like are added to the reactive plasma, the magnetic metal included in the magnetic layer 3 is reacted with oxygen atoms or the like, thereby achieving the modification of magnetic properties of the magnetic layer 3. In this case, if halogen atoms are included in the reactive plasma, the reactivity can be further enhanced. Additionally, even if oxygen atoms are not added to the reactive plasma, the halogen atoms are reactive with the magnetic alloy, thereby achieving the modification of magnetic properties of the magnetic layer 3. The reason for this is not clear in detail, but it is considered that the halogen atoms in the reactive plasma etch impurities formed on the surface of the magnetic layer 3, and the surface of the magnetic layer 3 is cleaned, thereby enhancing the reactivity of the magnetic layer 3. As a halogen atom that imparts such an effect, use of F atoms is particularly preferable.

In the present invention, the process of exposing the surface of the magnetic layer 3 partially to reactive plasma to modify the magnetic properties of the portion of the magnetic layer 3 preferably includes: exposing the magnetic layer 3 to plasma including oxygen (first step); and then exposing the magnetic layer 3 to plasma including a halogen (second step). By adopting such steps, the modifying rate of the magnetic properties of the magnetic layer 3 can be increased, and the residual magnetization, the coercive force, among others, of the magnetic layer 3 can be efficiently lowered. This is because, based on studies by the present inventors, a region of the grain boundary of magnetic particles is preferentially oxidized and the oxidized portion extends in the thickness direction along the grain boundary when the magnetic layer 3 is exposed to the oxygen-containing plasma; and, when the magnetic layer 3 is then exposed to the halogen-containing plasma, the oxidized portion in the grain boundary of magnetic particles is preferentially reacted with the halogen, the crystal structure of the portion is destroyed, and the reaction portion proceeds from the grain boundary to magnetic particles. Therefore, modification of the magnetic properties of the magnetic layer 3 can be accelerated, and the reaction of magnetic particles with the halogen can also be efficiently promoted, compared to simply exposing the magnetic layer 3 to oxygen plasma or halogen plasma. Consequently, the residual magnetization, the coercive force, among others, of the magnetic layer 3 can be efficiently lowered.

In the present invention, a step of injecting ions partially into the surface of the magnetic layer 3 is preferably provided before the step of exposing the surface of the magnetic layer 3 partially to reactive plasma. When such a step is provided, modification of magnetic properties of the magnetic layer 3 can be further accelerated. This is because, based on studies by the present inventors, when ions are injected partially to the surface of the magnetic layer 3, the surface of the magnetic layer 3 becomes active, and the reactivity of the magnetic layer 3 with plasma is further enhanced in the step of exposing the magnetic layer 3 to reactive plasma after the ion-injection.

In the present invention, it is preferable that an inert ion such as argon or nitrogen be used as the ions injected into the magnetic layer 3. This is because such an inert ion does not adversely affect the reactivity of the magnetic layer 3 with the reactive plasma after the ion-injection.

In the present invention, the following steps are preferably adopted. That is, a resist pattern which is adjusted to the magnetic recording pattern is formed on the magnetic layer 3. After that, the surface thereof is treated with reactive plasma, and then, the resist is removed, and a protective layer 5 is formed thereon. Next, a lubricant is coated thereon, thereby producing a magnetic recording medium. This is because such a method can further enhance the reactivity of the magnetic layer 3 with reactive plasma.

Figure 3:
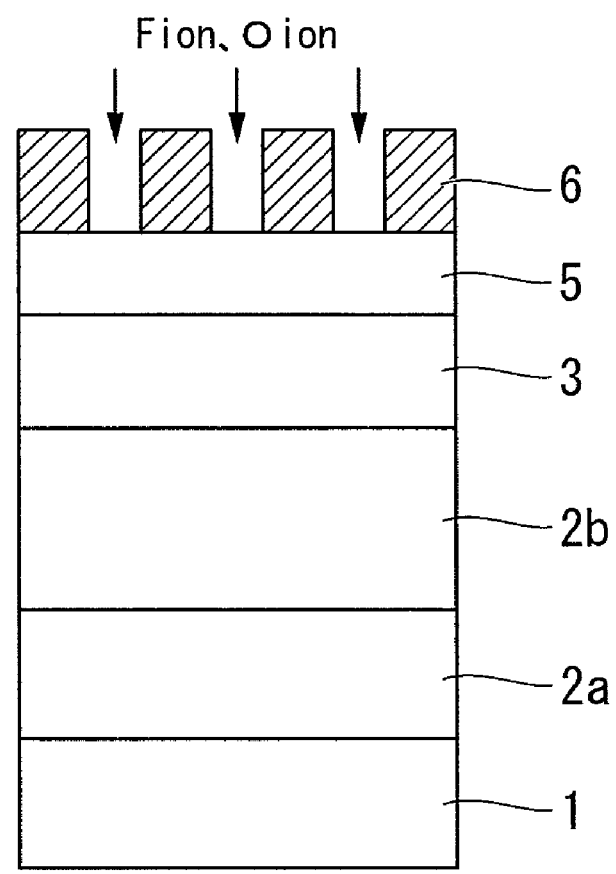
FIG. 3 explains the method of producing a magnetic recording medium according to the present invention.

Furthermore, the following steps may also be adopted in the present invention as illustrated in FIG. 3. That is, a protective layer 5 is formed on the magnetic layer 3, and a resist pattern 6 which is adjusted to the magnetic recording pattern is formed thereon. Then, the treatment of modifying the magnetic layer 3 with reactive plasma is conducted. Because it is unnecessary to form a protective layer 5 after the reactive plasma treatment, the production process is very simple, the productivity can be improved, and contamination can be prevented in the process of producing a magnetic recording medium. The present inventors demonstrated by conducting experiments that the magnetic layer 3 could be reacted with reactive plasma even after the protective layer 5 was formed on the surface of the magnetic layer 3. With regard to a reason why the magnetic layer 3 covered by the protective layer 5 can react with reactive plasma, based on the present inventors' assumption, voids or the like may be present in the protective layer 5, reactive ions in plasma intrude into the layer from the voids, and the reactive ions may react with the magnetic metal, as illustrated in FIG. 3. Furthermore, it is assumed that the reactive ions spread in the protective layer 5, and the reactive ions reach the magnetic layer 3.

With regard to the formation of the resist pattern, a method wherein a resist is coated onto the magnetic layer 3 or a protective layer 5, which is formed subsequently to the magnetic layer 3, a stamper is placed directly thereon, and this is pressed at high pressure to form a resist pattern can be adopted. Furthermore, a general photolithographic technique may also be applied to form a pattern. Examples of the resist include a thermoset resin, a UV-curable resin, SOG, or the like.

As the stamper used in the above process, for example, a metal plate on which a fine track pattern is formed by the electron beam lithography or the like can be used. The material for the stamper requires sufficient hardness and durability to withstand the process. For example, Ni or the like can be used, but the material is not particularly limited as long as it meets the above-described purpose. As the stamper, besides tracks where general data are recorded, servo-signal patterns such as a burst pattern, gray code pattern, or preamble pattern can also be formed.

In order to remove the resist after the reactive plasma treatment, a technique such as the dry etching, the reactive ion etching, the ion trimming, or the wet etching can be adopted.

With regard to formation of the protective layer 5, a thin film of diamond like carbon is formed using the P-CVD, among others, in general. However, the method is not particularly limited.

Examples of the protective layer 5 include a carbonaceous layer such as carbon (C), a carbon hydride ($H_xC$), carbon nitride (CN), amorphous carbon, or silicon carbide; or a material generally used for a protective layer (for example, $SiO_2$, $Zr_2O_3$, TiN, etc.). Additionally, the protective layer 5 may include two or more layers.

It is required that the thickness of the protective layer 5 be less than 10 nm. If the thickness of the protective layer 5 exceeds 10 nm, then, the distance between the head and the magnetic layer 5 is excessively longer. Consequently, sufficient strength of the output and input signal can not be obtained.

It is preferable that a lubricant layer be formed on the protective layer 5. Examples of the lubricant used for the lubricant layer include a fluorine-based lubricant, a carbon hydride-based lubricant, or a mixture thereof. In general, the lubricant layer is formed into a thickness of 1 to 4 nm.

Figure 2:
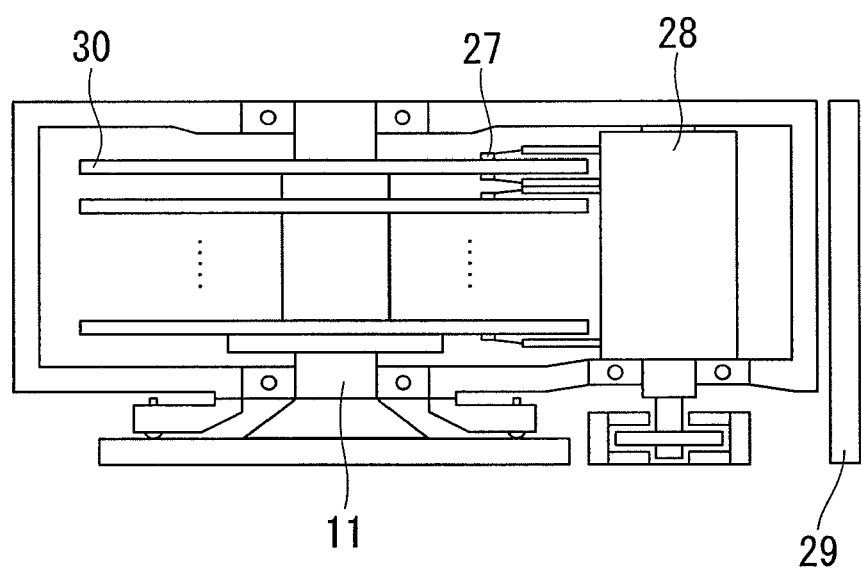
FIG. 2 shows a configuration of the magnetic recording and reading device according to the present invention.

Next, the configuration of the magnetic recording and reading device of the present invention is shown in FIG. 2. The magnetic recording and reading device of the present invention includes: the above-described magnetic recording medium 30; an actuating device 11 which actuates the magnetic recording medium 30 in the recording direction; a magnetic head 27 which includes a recording part and a reading part; a head-actuating unit 28 which moves the magnetic head 27 relatively to the magnetic recording medium 30; and a signal recording and reading processing unit 29 combined with a recording and reading signal-processing system which inputs a signal to the magnetic head 27 and which reads an output signal from the magnetic head 27. When these components are combined, a magnetic recording device achieving higher recording density can be produced. Because the recording tracks of the magnetic recording medium are processed into a magnetically discontinuous structure, the width of the reading head can be made to be the same as the width of the recording head, and they can be actuated while the width of the reading head has been conventionally made narrower than the recording head to eliminate the influence of the magnetic transition region of the track edge portion. Accordingly, a sufficient reading output and a higher SNR can be obtained.

Moreover, when the above-described reading part of the magnetic head 27 is formed with a GMR head or TMR head, sufficient signal strength can be obtained even in higher recording density, and a magnetic recording device having high recording density can be achieved. Furthermore, when the flying height of the magnetic head 27 is adjusted to 0.005 to 0.020 μm (i.e. when the magnetic head is flown at a height lower than prior arts), the output is improved, thereby achieving a higher SNR in the device. Therefore, a magnetic recording device having large capacity and high reliability can be provided. In addition, if a signal-processing circuit according to the maximum likelihood decoding is combined, the recording density can be further improved. For example, even if recording and reading are conducted at a track density of 100 KTPI or more; a track recording density of 1000 kbit/inch or more; and a recording density of 100 Gbit/inch$^2$, a sufficient SNR can be obtained.

EXAMPLES

Example 1

A vacuum chamber, herein a HD glass substrate was set, was vacuumed at $1.0 \times 10^{-5}$ Pa or less in advance. The glass substrate was made of a crystallized glass that included $Li_2Si_2O_5$, $Al_2O_3$—$K_2O$, $Al_2O_3$—$K_2O$, $MgO$—$P_2O_5$, and $Sb_2O_3$—$ZnO$ as components. The outer diameter was 65 mm; the inner diameter was 20 mm; the average surface roughness (Ra) was 2 angstrom (unit: Å; and equal to 0.2 nm).

On the glass substrate, using the DC sputtering, FeCoB as a soft magnetic layer; Ru as an intermediate layer; and 70Co-5Cr-15Pt-10SiO$_2$ alloy as a magnetic layer were laminated in order; and, using the P-CVD method, a C (carbon) protective layer, and a fluorine-based lubricant film were further laminated as thin films thereon in order. With regard to the thickness of each layer, the FeCOB soft magnetic layer was 600 Å; the Ru intermediate layer was 100 Å; the magnetic layer was 150 Å; and the C (carbon) protective layer was 4 nm on average.

A UV-curable resin was coated thereon in a thickness of 200 nm, and its surface was imprinted using a Ni stamper prepared in advance. The stamper had a track pitch of 100 nm, and grooves whose depth was 20 nm. Using this stamper, an imprint was made on the UV-curable resin coated on the protective layer.

Its surface was exposed to reactive plasma, and modification of a portion which was not covered by the UV-curable resin was conducted. The reactive plasma treatment against the magnetic layer was conducted by using an inductively coupled plasma apparatus "NE550" produced by ULVAC, Inc. With regard to the gas used for generating plasma and conditions in the plasma generation, for example, $SF_6$ was used at 10 cc/minute, and $O_2$ was used at 90 cc/minute. The applied power for generating plasma was 200 W; the pressure inside the apparatus was adjusted to 0.5 Pa; and the substrate bias was 200 W; and the surface of the magnetic recording medium was treated for 60 seconds. The portion of the magnetic layer treated with reactive plasma was analyzed based on X-ray diffraction. In the results, a signal derived from Co disappeared. On the other hand, a signal derived from cobalt fluoride was not observed, and it was confirmed that the portion was formed into an amorphous structure.

The production conditions are summarized in Table 1.

After that, the resist remaining on the surface of the magnetic recording medium was removed by the dry etching, and a fluorine-based lubricant film was finally coated thereon to complete the production of the magnetic recording medium.

Examples 2 to 22

Magnetic recording media were produced in the same manner as Example 1. In this case, the type of gas used for generating the reactive plasma, the applied power, the reaction pressure, and the reaction time was modified as shown in Table 1. In Examples 2 to 22, the X-ray diffraction analysis was conducted with respect to the portion of the magnetic layer treated with reactive plasma. In the results, a signal derived from Co disappeared. On the other hand, a signal derived from cobalt fluoride was not observed, and it was confirmed that the portion was formed into an amorphous structure in all Examples 2 to 22.

Comparative Example

A magnetic recording medium was produced in the same manner as Example 1. However, when the magnetic layer was treated with reactive plasma, a bias voltage was not applied to the substrate, and oxygen was not included in the plasma gas. With regard to the produced magnetic recording medium, the X-ray diffraction analysis was conducted with respect to the portion of the magnetic layer treated with reactive plasma. In the results, a signal derived from Co disappeared. On the other hand, a signal derived from cobalt fluoride was observed, and a broad signal derived from amorphization of Co was not observed.

Figure 4:
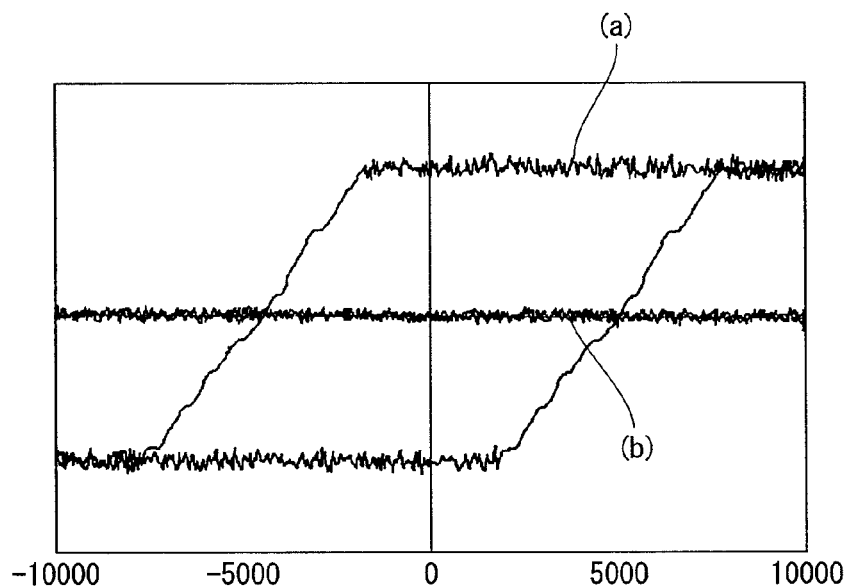
FIG. 4 shows the change in the magnetization magnitude before and after the treatment of the magnetic recording medium shown in Example 1 with reactive plasma.

With regard to the magnetic recording media produced in Examples 1 to 22 produced by the above-described method, a decrement in the magnetization magnitude, a decrement in the coercive force, electromagnetic conversion properties (SNR and 3T-squash), the surface roughness (Ra), and the head-flying height (glide avalanche) were measured. The evaluation of electromagnetic conversion properties was conducted using a spin stand. In this case, as heads for the evaluation, a perpendicular recording head was used for recording, and a TuMR head was used for reading. A SNR value and 3T-squash were measured when a signal of 750 kFCI was recorded therein. FIG. 4 shows a change in the magnetization magnitude before and after the reactive plasma treatment with respect to the magnetic recording medium shown in Example 1. The results of the evaluation are shown in Table 1 with respect to Examples 1 to 22.

The produced magnetic recording media had excellent RW properties such as SNR or 3T-squash, and their head-flying properties were also stable. That is, the produced magnetic recording media had higher surface flatness, and excellent separating properties according to the non-magnetic portion between tracks in the magnetic layer.

(Time-course Evaluation on Changes in Electromagnetic Conversion Properties of Magnetic Recording Media)

With respect to the magnetic recording media produced in Example 1 and Comparative Example, changes in their SNR and coercive force were evaluated before and after incubating them in an oven at 80° C. and in a humidity of 80% for 720 hours.

The SNR evaluation was conducted using a read/write analyzer "RWA1632" produced by Guzik Technical Enterprises, and a spin stand "S1701MP". A shielded-type head was used for a writing part, and a magnetic head using a GMR device was used for a reading part. The SNR was obtained as a rms value (root mean square-inches) where Sp-p was 160 kFCI and N was 960 kFCI. As a result, the magnetic recording media both in Example 1 and Comparative Example had sufficient SNR and coercive force before the time-course evaluation. However, after the evaluation, the SNR decreased by 0.1%, and the coercive force decreased by 1% in the magnetic recording medium of Example 1. On the other hand, the SNR decreased by 0.4%, and the coercive force decreased by 8% in the magnetic recording medium of Comparative Example.

TABLE 1

| | Type of plasma gas | Applied power (W) | Reaction pressure (Pa) | Treatment time (second) | Magnetization magnitude after treatment (%) | Coercive force after treatment (%) | SNR (dB) | 3T-squash (%) | Ra (nm) | Glide avalanche (nm) |
|---|---|---|---|---|---|---|---|---|---|---|
| Example 1 | 10% $SF_6/O_2$ | 200 | 0.5 | 60 | 4 | 7 | 13.1 | 91 | 0.58 | 5.9 |
| Example 2 | 10% $SF_6/O_2$ | 200 | 0.1 | 120 | 3 | 9 | 12.5 | 91 | 0.6 | 6.1 |
| Example 3 | 10% $SF_6/O_2$ | 200 | 2 | 120 | 5 | 14 | 12.8 | 87 | 0.6 | 6.1 |
| Example 4 | 50% $SF_6/O_2$ | 200 | 0.5 | 60 | 2 | 13 | 13.2 | 90 | 0.6 | 6 |
| Example 5 | 90% $SF_6/O_2$ | 200 | 0.5 | 60 | 4 | 18 | 12.9 | 89 | 0.6 | 6.2 |
| Example 6 | 10% $CF_4/O_2$ | 200 | 0.5 | 60 | 1 | 1 | 13.7 | 93 | 0.59 | 6.1 |
| Example 7 | 50% $CF_4/O_2$ | 200 | 0.5 | 50 | 2 | 4 | 13.5 | 92 | 0.65 | 6.6 |
| Example 8 | 10% $CHF_3/O_2$ | 300 | 0.5 | 110 | 13 | 26 | 12.1 | 84 | 0.57 | 5.8 |
| Example 9 | 25% $CHF_3/O_2$ | 300 | 0.5 | 100 | 16 | 29 | 12 | 88 | 0.58 | 5.8 |
| Example 10 | 15% $C_4F_8/O_2$ | 300 | 0.8 | 60 | 9 | 18 | 12.6 | 87 | 0.61 | 6.3 |
| Example 11 | 30% $CH_2F_2$ | 400 | 0.5 | 120 | 11 | 19 | 12.8 | 88 | 0.58 | 5.7 |
| Example 12 | 10% $C_2F_6/O_2$ | 200 | 0.5 | 60 | 8 | 16 | 12.9 | 89 | 0.59 | 6 |
| Example 13 | 10% $C_3F_8/O_2$ | 200 | 0.5 | 60 | 5 | 14 | 13 | 90 | 0.61 | 6.2 |
| Example 14 | 5% $F_2/O_2$ | 200 | 0.3 | 60 | 11 | 22 | 12.6 | 86 | 0.59 | 6 |
| Example 15 | 25% $HF/O_2$ | 250 | 0.8 | 60 | 14 | 31 | 12.3 | 84 | 0.58 | 6.1 |
| Example 16 | 13% $BF_3/O_2$ | 200 | 0.5 | 50 | 7 | 13 | 13.3 | 90 | 0.59 | 5.9 |
| Example 17 | 15% $NF_3/O_2$ | 150 | 0.6 | 60 | 9 | 11 | 13.2 | 88 | 0.59 | 6 |
| Example 18 | $CH_2Cl_2$ | 300 | 1 | 80 | 19 | 19 | 12.1 | 85 | 0.64 | 6.7 |
| Example 19 | $CH_3Br$ | 300 | 1 | 75 | 21 | 27 | 11.9 | 84 | 0.66 | 6.9 |
| Example 20 | $SF_6$ | 200 | 0.5 | 180 | 35 | 38 | 12.1 | 78 | 0.64 | 6.5 |
| Example 21 | $CF_4$ | 200 | 0.5 | 160 | 24 | 43 | 11.8 | 80 | 0.69 | 7.1 |
| Example 22 | $O_2$ | 200 | 0.5 | 300 | 58 | 49 | 11.4 | 74 | 0.58 | 5.9 |

INDUSTRIAL APPLICABILITY

The method of producing a magnetic recording medium, the magnetic recording medium thereof, and the magnetic recording and reading device using the same can be applied in various industrial fields such as electronics or information technology. Therefore, the present invention has higher industrial applicability.

The invention claimed is:

1. A method of producing a magnetic recording medium having a magnetically-separated magnetic recording pattern, the method comprising:
    forming a magnetic layer over a non-magnetic substrate; and
    then exposing a surface of the magnetic layer partially to reactive plasma, or a reactive ion generated in the plasma to amorphize a portion of the magnetic layer and to modify the magnetic properties of the portion whereby a magnetically-separated magnetic recording pattern is formed,
    wherein the reactive plasma includes a halogen ion to form a halide of a substance constituting the magnetic layer, and removing the halogen from the halide in the portion of the magnetic layer which is exposed to the halogen ion to form a portion that does not substantially include a halide of a substance constituting the magnetic layer.

2. The method of producing a magnetic recording medium according to claim 1, wherein the magnetization magnitude of the portion of the magnetic layer which is exposed to reactive plasma is adjusted to 75% or less of the original magnetization magnitude thereof in modifying the magnetic properties.

3. The method of producing a magnetic recording medium according to claim 1, wherein the coercive force of the portion of the magnetic layer which is exposed to reactive plasma is adjusted to 50% or less of the original coercive force thereof in modifying the magnetic properties.

4. The method of producing a magnetic recording medium according to claim 1, wherein the reactive plasma is plasma which includes an oxygen ion generated by introducing an oxygen gas.

5. The method of producing a magnetic recording medium according to claim 1, wherein the reactive plasma includes oxygen and a halogen.

6. The method of producing a magnetic recording medium according to claim 1, wherein the magnetic layer is exposed to plasma including oxygen, and then the magnetic layer is exposed to plasma including a halogen in exposing the surface of the magnetic layer partially to reactive plasma to modify magnetic properties of the portion of the magnetic layer.

7. The method of producing a magnetic recording medium according to claim 1 further comprising injecting an ion partially to the surface of the magnetic layer before exposing the surface of the magnetic layer partially to reactive plasma.

8. The method of producing a magnetic recording medium according to claim 7, wherein the injected ion is argon or nitrogen.

9. The method of producing a magnetic recording medium according to claim 1, wherein the halogen ion is a halogen ion which is formed by introducing into the reactive plasma at least one halogenated gas selected from the group consisting of $CF_4$, $SF_6$, $CHF_3$, $CCl_4$, and KBr.

10. The method of producing a magnetic recording medium according to claim 1, wherein the halogen ion is an F ion.

11. The method of producing a magnetic recording medium according to claim 1, wherein, after the magnetic layer is formed over the non-magnetic substrate, a resist pattern for forming the magnetically-separated magnetic recording pattern is formed on the surface of the magnetic layer, and then, a portion which is not covered with the resist pattern is exposed to the reactive plasma to modify magnetic properties of the portion, thereby forming the magnetically-separated magnetic recording pattern.

12. The method of producing a magnetic recording medium according to claim 1, wherein a resist pattern is formed after a protective layer is formed on the magnetic layer.

13. The method of producing a magnetic recording medium according to claim 1, wherein the magnetic recording pattern is a perpendicular magnetic recording pattern.

* * * * *